US012673467B2

(12) United States Patent
Agrawal et al.

(10) Patent No.: US 12,673,467 B2
(45) Date of Patent: Jul. 7, 2026

(54) CREATING OBJECTS THROUGH PHOTOSENSITIVE RESIN

(71) Applicant: INTERNATIONAL BUSINESS MACHINES CORPORATION, Armonk, NY (US)

(72) Inventors: Tushar Agrawal, West Fargo, ND (US); Sarbajit Kumar Rakshit, Kolkata (IN); Jennifer M. Hatfield, Portland, OR (US); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 18/792,804

(22) Filed: Aug. 2, 2024

(65) Prior Publication Data

US 2026/0034742 A1 Feb. 5, 2026

(51) Int. Cl.
| | |
|---|---|
| *B29C 64/40* | (2017.01) |
| *B29C 64/124* | (2017.01) |
| *B29C 64/129* | (2017.01) |
| *B29C 64/135* | (2017.01) |
| *B29C 64/188* | (2017.01) |
| *B29C 64/386* | (2017.01) |

(Continued)

(52) U.S. Cl.
CPC ............ *B29C 64/40* (2017.08); *B29C 64/124* (2017.08); *B29C 64/129* (2017.08); *B29C 64/135* (2017.08); *B29C 64/386* (2017.08); *B33Y 10/00* (2014.12); *B33Y 50/00* (2014.12); *B29C 64/188* (2017.08); *B33Y 40/20* (2020.01)

(58) Field of Classification Search
CPC ..... B29C 64/40; B29C 64/129; B29C 64/124; B29C 64/135; B29C 64/386; B29C 64/188; B29C 64/393; B29C 33/48; B33Y 10/00
See application file for complete search history.

(56) References Cited

U.S. PATENT DOCUMENTS

| | | |
|---|---|---|
| 7,785,524 B2 | 8/2010 | Imai et al. |
| 10,416,541 B2 | 9/2019 | Hou |

(Continued)

FOREIGN PATENT DOCUMENTS

| | | |
|---|---|---|
| CN | 108724726 A | 11/2018 |

OTHER PUBLICATIONS

"Small Cubes That Self-Assemble", YouTube, retrieved from web dated May 30, 2024, 4 pages, https://www.youtube.com/watch?v=6aZbJS6LZbs.

(Continued)

*Primary Examiner* — Galen H Hauth
*Assistant Examiner* — Mohamed K Ahmed Ali
(74) *Attorney, Agent, or Firm* — Joseph P. Curcuru

(57) ABSTRACT

In an approach to improve three-dimensional (3D) manufacturing, methods determine, based on shape and dimensions of a hollow portion of a three-dimensional (3D) object, to create the 3D object using self-assembling cube robots submerged in a photosensitive resin tank. Additionally, methods instruct the self-assembling cube robots to collaborate to form an approximate shape of the hollow portion of the 3D object. Further, methods causing an ultraviolet (UV) projection system to emit holographic light beams around a structure of the self-assembling cube robots to create the 3D object with the hollow portion.

7 Claims, 4 Drawing Sheets

(51) Int. Cl.
B33Y 10/00 (2015.01)
B33Y 40/20 (2020.01)
B33Y 50/00 (2015.01)

(56) References Cited

U.S. PATENT DOCUMENTS

| | | | |
|---|---|---|---|
| 10,828,698 | B2 | 11/2020 | Mark |
| 2016/0325429 | A1 | 11/2016 | Rus et al. |
| 2017/0197361 | A1 | 7/2017 | Stadlmann |
| 2018/0361680 | A1 | 12/2018 | Bharti et al. |
| 2021/0347125 | A1 | 11/2021 | Varga et al. |
| 2022/0009173 | A1* | 1/2022 | Rakshit ................. B29C 64/393 |
| 2022/0088692 | A1 | 3/2022 | Patnaikuni et al. |
| 2023/0256681 | A1 | 8/2023 | Rakshit |

OTHER PUBLICATIONS

Anonymous, "Filled Cavities Created by 3D Additive Manufacturing", An IP.com Prior Art Database Technical Disclosure, IP.com No. IPCOM000243090D, IP.com Electronic Publication Date: Sep. 14, 2015, 4 pages.

Anonymous, "Method and System for 3D Printing with a Primary Printed Head in Association with Swarm Insect Robots", An IP.com Prior Art Database Technical Disclosure, IP.com No. IPCOM000274220D, IP.com Electronic Publication Date: Apr. 17, 2024, 5 pages.

DesignBoom, "MIT's self-assembling cube robots could be used in emergency response situations", accessed on May 30, 2024, 8 pages, https://www.designboom.com/technology/mit-self-assembling-cube-robots-transformers-11-01-2019/.

GlobeNewswire, "With 24.3% CAGR, 3D Printing Market Size Worth USD 83.90 Billion in 2029", Fortune Business Insights, Apr. 19, 2022, 9 pages, https://www.globenewswire.com/en/news-release/2022/04/19/2424496/0/en/With-24-3-CAGR-3D-Printing-Market-Size-Worth-USD-83-90-Billion-in-2029.html.

Hardesty Larry. "Surprisingly Simple Scheme for Self-Assembling Robots", MIT News Office, Oct. 4, 2013, 5 pages.

IBM Lighthouse, "Shifting transport paradigms: Understanding the implications of 3D printing on the global transportation industry", Modified Jun. 11, 2015, 4 pages, https://w3.ibm.com/services/lighthouse/documents/39220.

IBM, "Latest Release of IBM iConnect Access® Provides Foundation for Planned Future 3D Printing Solution", May 24, 2021, 3 pages. https://newsroom.ibm.com/2021-05-24-Latest-Release-of-IBM-iConnect-Access-R-Provides-Foundation-for-Planned-Future-3D-Printing-Solution?printable.

IBM, "What is industry 4", accessed on May 30, 2024, 13 pages, https://www.ibm.com/topics/industry-4-0.

Kelly et al., "Volumetric Additive Manufacturing Via Tomographic Reconstruction", Science, Mar. 8, 2019, pp. 1075-1079, vol. 363, https://science.sciencemag.org/content/363/6431/1075.

MarketsandMarkets, "3D Printing Market Size, Share & Industry Growth Analysis by Offering (Printer, Material, Software, Services), Technology (Fused Deposition Modelling, Stereolithography), Process (Powder Bed Fusion, Material Extrusion, Binder Jetting), Application, Vertical & Region—Global Forecast to 2029", Report, accessed on Jun. 3, 2024, 16 pages, https://www.marketsandmarkets.com/Market-Reports/3d-printing-market-1276.html.

Peterson et al., "Shifting transport paradigms", IBM, Sep. 2014, 16 pages, https://www.ibm.com/thought-leadership/institute-business-value/report/3d-printing.

Romanishin et al. "M-blocks: Momentum-driven, magnetic modular robots", In 2013 IEEE/RSJ International Conference on Intelligent Robots and Systems, IEEE, Nov. 3-7, 2013, pp. 4288-4295.

Sher, "More details emerge on UC Berkeley-LLNL new CAL volumetric 3D printing", Newsletter, Feb. 1, 2019, 16 pages, https://www.3dprintingmedia.network/more-details-emerge-on-uc-berkeley-llnl-new-cal-volumetric-3d-printing-method/.

Stumpfe, "Digital platform for industrial 3D printing", IBM Blog, Apr. 4, 2019, 12 pages, https://www.ibm.com/blogs/blockchain/2019/04/digital-platform-for-industrial-3d-printing/.

Vialva, "IBM 3d Printing Patent Indicates Interest in Additive Manufacturing", Research, Apr. 25, 2019, 5 pages, https://3dprintingindustry.com/news/ibm-3d-printing-patent-indicates-interest-in-additive-manufacturing-154181/.

Wikipedia, "Photopolymer", accessed on May 30, 2024, 9 pages, https://en.wikipedia.org/wiki/Photopolymer.

* cited by examiner

100

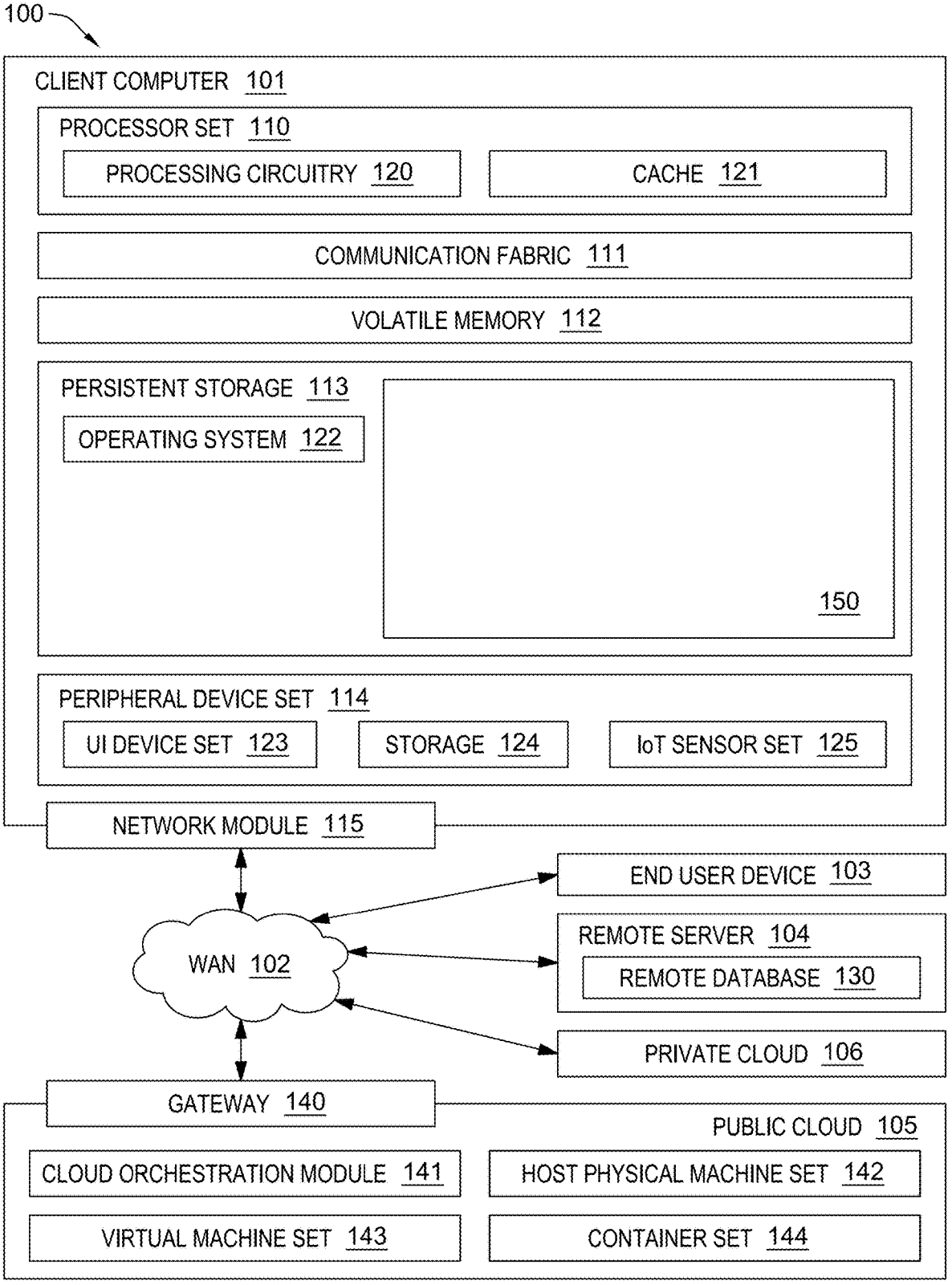

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

CREATING OBJECTS THROUGH PHOTOSENSITIVE RESIN

BACKGROUND OF THE INVENTION

The present invention relates generally to manufacturing, and more particularly to the field of manufacturing three-dimensional objects.

A photopolymer or light-activated resin is a polymer that changes its properties when exposed to light, often in the ultraviolet or visible region of the electromagnetic spectrum. These changes are often manifested structurally, for example hardening of the material occurs as a result of cross-linking when exposed to light. For example, a mixture of monomers, oligomers, and photo-initiators that conform into a hardened polymeric material through a process called curing. A wide variety of technologically useful applications rely on photopolymers; for example, some enamels and varnishes depend on photopolymer formulation for proper hardening upon exposure to light. In some instances, an enamel can cure in a fraction of a second when exposed to light, as opposed to thermally cured enamels which can require half an hour or longer. Curable materials are widely used for medical, printing, and photoresist technologies. When UV light falls on photosensitive resin, then it resins solidifies within very short time, as per recent development, when light based holographic object is projected inside photosensitive resin, then 3D printed object is created. Changes in structural and chemical properties can be induced internally by chromophores that the polymer subunit already possesses, or externally by addition of photosensitive molecules. Typically, a photopolymer consists of a mixture of multifunctional monomers and oligomers in order to achieve the desired physical properties, and therefore a wide variety of monomers and oligomers have been developed that can polymerize in the presence of light either through internal or external initiation.

SUMMARY

Embodiments disclose a method, a system, and a computer program product for creating objects from photosensitive resin using self-assembled cube robots, the method comprising: determining, based on shape and dimensions of a hollow portion of a three-dimensional (3D) object, to create the 3D object using self-assembling cube robots submerged in a photosensitive resin tank; instructing the self-assembling cube robots to collaborate to form an approximate shape of the hollow portion of the 3D object; and causing an ultraviolet (UV) projection system to emit holographic light beams around a structure of the self-assembling cube robots to create the 3D object with the hollow portion.

Embodiments further disclose determining that a turbulence on the photosensitive resin caused by the self-assembling cube robots forming the approximate shape has stopped. Embodiments additionally disclose determining an effectiveness of the self-assembling cube robots to form the approximate shape of the hollow portion of the 3D object. Embodiments additionally disclose, wherein determining an effectiveness of the self-assembling cubes further comprises identifying dimensions of the self-assembling cube robots and a capability of self-assemble robots to climb over each other. Embodiments additionally disclose receiving manufacture instructions manufacture the 3D object. Embodiments additionally disclose analyzing the shape and dimensions of the 3D object associated with received manufacture instructions. Embodiments further disclose responsive to the at least hollow portion of the 3D object being formed and solidified, removing the self-assembling cube robots from the form shape to leave at least the formed hollow portion.

BRIEF DESCRIPTION OF THE DRAWINGS

FIG. 1 is a functional block diagram illustrating a distributed data processing environment, executing a three-dimensional (3D) manufacturing program, in accordance with an embodiment of the present invention;

DETAILED DESCRIPTION

Figure 2:
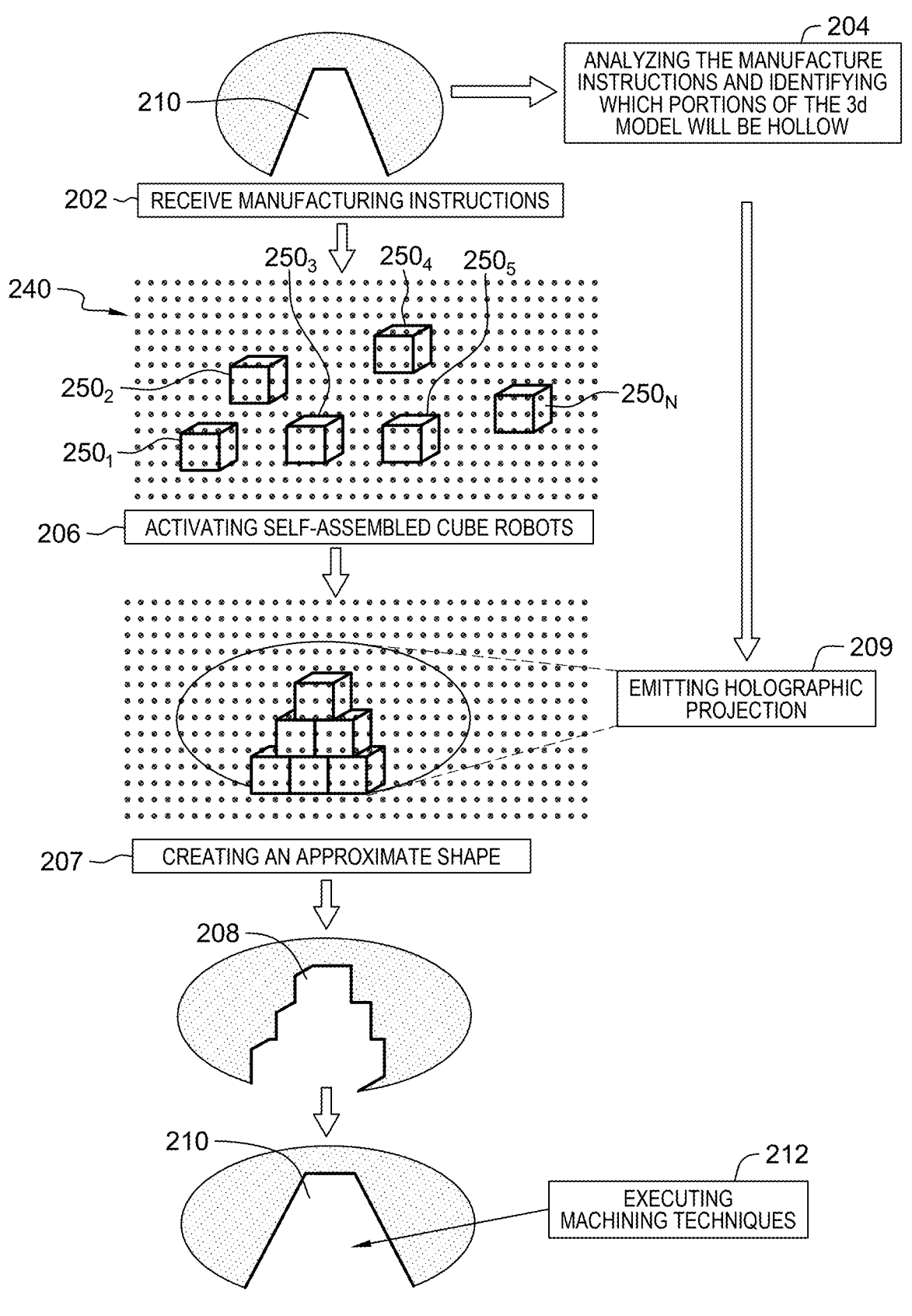
FIG. 2 illustrates a functional block diagram and operational steps of the 3D manufacturing program, on a server computer within the distributed data processing environment of FIGS. 1, in accordance with an embodiment of the present invention.

Embodiments recognize that while printing a hollow 3D object using photosensitive resin, the light beam, in the current art, projected within the gel may not be sufficient to produce the desired hollow structure. Hollow 3D objects are necessary for various applications, as they result in lightweight objects and enable cost-effective manufacturing of products. The hollow portion may require for some additional machining, for that hollow portion is required, in this case, if solid 3D object is created, then amount of material removal will be more.

Embodiments, improve the art and solve, at least, the particular issues above by (i) employing a group of self-assembled cube robots submerged in the photosensitive resin tank, (ii) utilizing self-assembled cube robots submerged in the photosensitive resin tank to create an outline of the object's hollow portion, (iii) utilizing an ultraviolet (UV) projection system to emit holographic light around the robot-formed structure to produce a 3D object with a hollow interior. More specifically, embodiments improve the art and solve, at least, the particular issues above by combining the approximate shape creation of self-assembled cube robots with the UV projection system. Further, a system analysis may be executed to ensure efficient robot assembly and minimal machining for manufacturing. For larger hollow objects, the self-assembled robots and UV projection system (i.e., UV projection modules) collaborate to create an effective workflow for producing approximate hollow 3D objects using photosensitive resin. Photosensitive resin may be any resin, polymer, and/or gel or hydrogel known and understood in the art.

Implementation of embodiments of the invention may take a variety of forms, and exemplary implementation details are discussed subsequently with reference to the Figures (i.e., FIG. 1-FIG. 4).

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails, and texts, and/or responsive display prompts begin with a written notification that the user's information may be recorded or monitored and may be saved, for the purpose of consolidating shipments to reduce carbon emissions and shipping costs. These embodiments may also include periodic reminders of such recording and monitoring throughout the course of any such use. Certain embodiments may also include regular (e.g., daily, weekly, monthly) reminders to the participating parties that they have consented to being recorded and monitored for collision avoidance and autonomous vehicle safety measures and may provide the participating parties with the opportunity to opt-out of such recording and monitoring if desired.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as three-dimensional (3D) manufacturing program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. IoT sensor set 125 may be any combination of proximity sensors, image sensor, motion sensor, thermistor, capacity sensing, photoelectric sensor, infrared sensor, level sensor, humidity sensor, pressure sensor, temperature sensor, and/or any sensor and/or IoT sensor known and understood in the art.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments, component 150 analyzes whether a hollow three-dimensional (3D) printed object should be produced using photosensitive resin. In various embodiments, based on the shape and dimensions of the hollow portion on the 3D object to be manufactured, component 150 utilizes and collaborates with a set of self-assembled cube robots, submerged within photosensitive resin tank to create an approximate shape of a hollow portion of the 3D printed object. In various embodiments, a UV projection system is utilized to emit holographic light beams around the structure of the self-assembled cube robots, resulting in the creation of 3D objects with a hollow configuration.

In various embodiments, component 150 creates a hollow 3D object (i.e., structure) with photosensitive resin by creating a predetermined hollow passage, stopping the turbulence within the photosensitive resin, and utilizing a UV projection system to project a UV light beam around the created structure. In various embodiments, responsive to a predetermined shape of a hollow passage of the 3D object is created, component 150 stops the turbulence within the photosensitive resin by controlling the movement of the set of the self-assembled cube robots within the photosensitive resin and utilizes the UV projection system to project a UV light beam around the created structure. In various embodiments, component 150 controls the movement of the self-assembled cube robots by providing/outputting instructions, and/or executing the self-assembled cube robots based on a set of received instructions. In various embodiments, component 150 executes an analysis of the created hollow 3D object, wherein, based on analysis of the hollow 3D object, component 150 identifies how effective the self-assembled cube robots may be at assembling to create the 3D structure. In various embodiments, component 150 utilizes the predicted efficiency to generate a workflow so that the self-assembled cube robots execute and terminate effectively. For example, if component 150 identifies that it would be efficient execute and terminate the self-assembled cube robots to create the identified predetermined 3D object, the component 150 will instruct the self-assembled cube robots execute and terminate simultaneously. In various embodiments, component 150 collaborates with and/or controls self-assembled cube robots and UV holographic projection modules to create a 3D object with photosensitive resin.

Component 150 improves the art and solve, at least, the particular issues above by (i) employing a group of self-assembled cube robots submerged in the photosensitive resin tank, (ii) utilizing self-assembled cube robots submerged in the photosensitive resin tank to create an outline of the object's hollow portion, (iii) utilizing an ultraviolet (UV) projection system to emit holographic light around the robot-formed structure to produce a 3D object with a hollow interior. More specifically, component 150 improves the art and solve, at least, the particular issues above by combining the approximate shape creation of self-assembled cube robots with the UV projection system. Further, a system analysis may be executed to ensure efficient robot assembly and minimal machining for manufacturing. For larger hollow objects, the self-assembled robots and UV projection system (i.e., UV projection modules) collaborate to create an effective workflow for producing approximate hollow 3D objects using photosensitive resin.

Further, improves the art and solve, at least, the particular issues above by (i) analyzing the shape and dimension of hollow portion of any 3D object, (ii) determining, based on shape and dimensions of a hollow portion of a 3D object, to create the 3D object using self-assembling cube robots submerged in a photosensitive resin tank, (iii) determining an effectiveness of the self-assembling cube robots to form the approximate shape of the hollow portion of the 3D object, (iv) instructing the self-assembling cube robots to collaborate to form the approximate shape of the hollow portion of the 3D object, (v) determining that a turbulence on the photosensitive resin caused by the self-assembling robots forming the approximate shape has stopped, and (vi) causing an ultraviolet (UV) projection system to emit holographic light beams around a structure of the self-assembling cube robots to create the 3D object with the hollow portion.

For example, in FIG. 2, component 150 creates (i.e., manufactures) a hollow portion 3D object 210 using photosensitive resin 240, self-assembled cube robots 2501-250N, and emitting holographic projection 209 via a UV light emitting system. In the depicted embodiment, component 150 receives manufacture instructions 202 to manufacture 3D object 210. FIG. 2 is an example of one embodiment. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 creates approximate shape 208 of an identified hollow portion of the 3D object 210. Component 150 analyzes the instructions and identifies which portions (i.e., 3D model) of 3D object 210 are hollow 204. In the depicted embodiment, self-assembled cube robots $250_1$-$250_N$, herein self-assembled robot(s) $250$, are present within photosensitive resin 240. As used herein, N represents a positive integer, and accordingly the number of scenarios implemented in a given embodiment of the present invention is not limited to those depicted in FIG. 2. In the depicted embodiment, responsive to component 150 identifying a hollow portion of 3D object 210, self-assembled robot(s) 250 within photosensitive resin 240 tank are activated 206. Responsive to being activated, self-assembled robot(s) 250 assemble to create an approximate shape 207 of the hollow shape structure of 3D object 210 based on the analysis of the received manufacture instructions 202 and the identified hollow portions of 3D object 210. In the depicted embodiment, responsive to self-assembled robot(s) 250 creating the approximate shape of the hollow shape structure, holographic projection 209 are emitted from UV light based holographic project module(s) around the approximate shape created by self-assembled robot(s) 250 within photosensitive resin 240. The combination of emitted holographic projections 209 around the created approximate shape 207 created by self-assembled robot(s) 250 create approximate hollow shape 208 (i.e., the approximate shape of the hollow shape structure). In the depicted embodiment, responsive to the creation of approximate hollow shape 208, 3D object 210 is created by executing machining techniques 212 to approximate hollow shape 208 so that 3D object 210 matches received manufacturing instructions 202.

Figure 3:
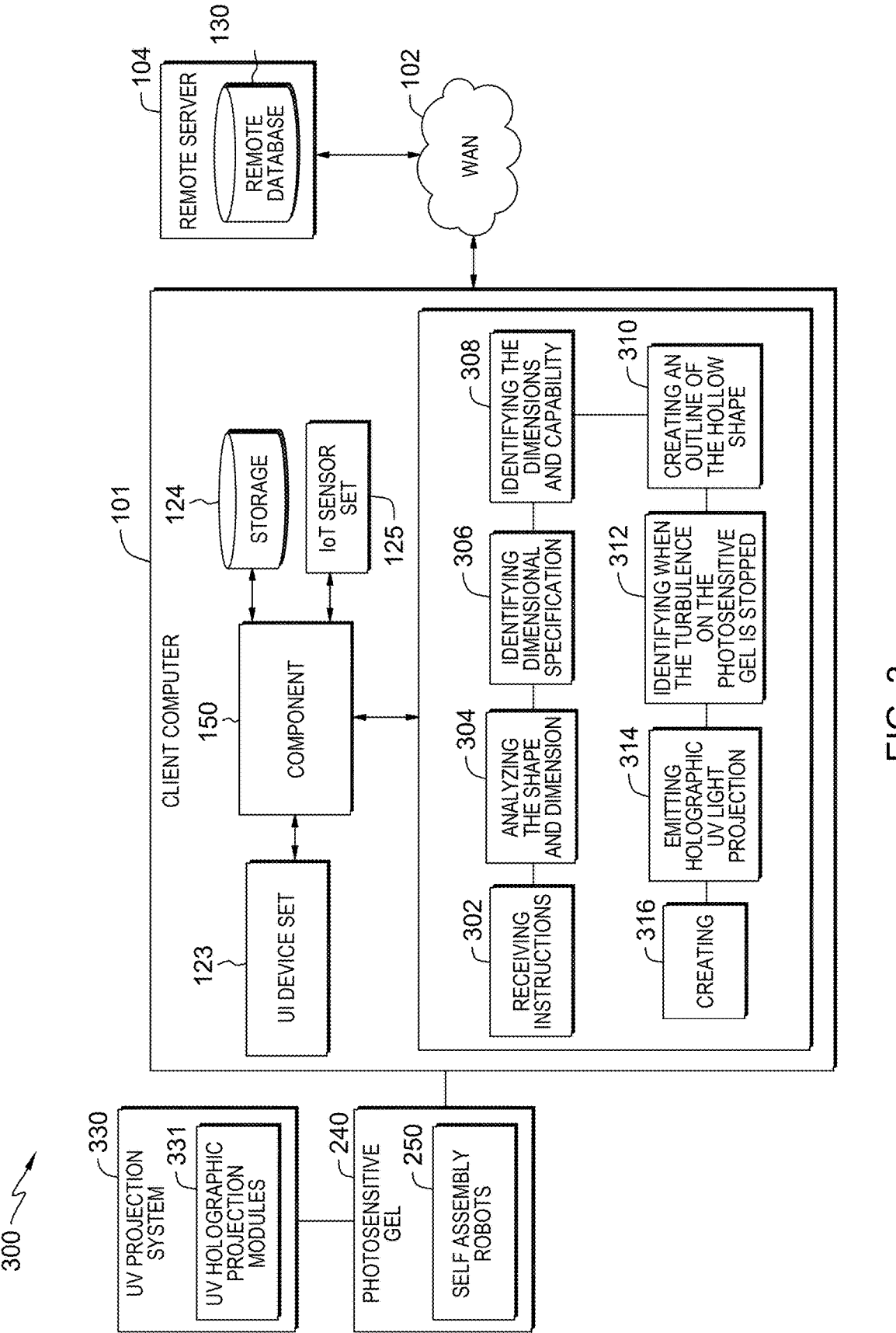
FIG. 3 illustrates a functional block diagram and operational steps of the 3D manufacturing program, on a server computer within the distributed data processing environment of FIGS. 1, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes client computer 101, and remote server 104 interconnected via WAN 102.

In the depicted embodiment, component 150 receives manufacture instructions 302 to manufacture a 3D object. In various embodiment, component 150 receives and/or retrieves manufacture instructions from a user and/or a data storage component (e.g., storage 124 or remote database 130). Component 150 utilizes received manufacture instructions 302 to create the 3D physical object that is within the instructions. Received manufacture instructions 302 comprise details and specifications (3D model) associated with 3D object. The 3D model provides the reference shape and dimensions of the final product and will identify the 3D object dimensional specification of the 3D object that is to be manufactured.

In the depicted embodiment, component 150 analyzes the shape and dimension 304 of the 3D object associated with received manufacture instructions 302. Component 150 analyzes the shape and dimension of the to be manufactured 3D object, based on the manufacture instructions.

In the depicted embodiment, component 150 identifies the dimensional specification 306 of the to be manufactured 3D object, based on the analysis. Component 150 utilizes the identified dimensional specification 306 to identify any hollow portions within the to be manufactured 3D object. In various embodiments, component 150 utilizes the identified hollow portions and 3D model from the received instructions to create a mold using self-assembled robots 250 and photosensitive resin 240 (see details below).

In the depicted embodiment, component 150 identifies the dimensions and capability 308 of self-assemble robot(s) 250. Component 150 may identify the dimensions and capability of self-assemble robot(s) 250, and the capability of self-assemble robot(s) 250 to climb over each other. In various embodiments, component 150 compares the identified dimensions and capability of each of self-assembled robot(s) 250 against each other. In various embodiments, component 150 determines the dimensions of the individual cubes intended to arrange within the 3D space to create the 3D object within photosensitive resin 240. The measured dimensions comprise: the length, width, and height of each self-assembled robot. In various embodiments, component 150 retrieves and/or receives the dimensions of the identified hollow space within the 3D object model, wherein the dimensions comprises: length, width, and height of the available space. In various embodiments, component 150 calculates the volume of each self-assembled cube robot(s) 250 using predetermined dimensions (e.g., Volume=Length×Width×Height). In various embodiments, component 150 calculates the total volume of the hollow 3D space using the identified dimensions. In various embodiments, component 150 divides the total volume of the available 3D space by the volume of each self-assembled cube robot(s) 250. This will provide the maximum theoretical number of self-assembled cube robot(s) 250 that could fit within the space without overlap or voids. Depending on the arrangement pattern, component 150 considers the potential overlap or gaps between self-assembled cube robot(s) 250. In various embodiments, component 150 may identify and generate a list of different arrangement patterns have varying packing efficiencies based on the identified dimensions and capabilities.

In various embodiments, responsive to identifying the mold profile or one or more hollow-shaped portions of a to be manufactured 3D object, component 150 selects specific self-assembled robots 250 based on the dimensions of the self-assembled robots 250 and the identified mold profile and/or identified hollow portions of the 3D object. In some embodiments a combination of different self-assembled robots 250 with different dimensions are used to create an outline of the 3D object or at least the hollow portion of the 3D object. For example, at least two different types (e.g., size and shape) of self-assembled robots 250 are assembled to create an approximate shape of the 3D object and will displace the photosensitive resin. In various embodiments, while assembling self-assembled robots 250 to create the identified shape, component 150 identifies a tolerance limit (e.g., a predetermined tolerance threshold), so that the tolerance can be removed with machining. For example, if the dimension of a hollow space in any direction is 10 cm, then the cubical self-assemble robots are to be selected, so that minimum possible tolerance can be kept based on available types of cubical robot. In this example, 9.5 cm can be created, so 0.5 cm will be the tolerance, wherein the self-assembled robots are removed with post processing methods. Post processing methods comprise cutting, grinding, polishing, and/or any other type of post processing method known and understood in the art.

In the depicted embodiment, component 150 creates an outline of the hollow shape 310. In various embodiments, component 150 creates an outline of the hollow portion of the 3D object by assembling the self-assembled cube robot(s) 250 within photosensitive resin 240 to create a structure that is an approximate shape of the identified hollow portion of the 3D object, wherein the approximate shape is shape corresponding to the 3D model that is within a predetermined threshold of acceptance. In various embodiments, self-assembled cube robot(s) 250 are submerged in photosensitive resin 240 where they create and hold the structure of the approximate shape to create the outline of the hollow portion of the intended 3D hollow shape of the 3D object. In various embodiments, self-assembled cube robot(s) 250 comprise components that enable each self-assembled cube robot to connect and assemble autonomously. Each cube robot of self-assembled cube robot(s) 250 comprises sensors, actuators, and mechanisms for movement and connection. In various embodiments, photosensitive resin 240 is held within a predetermined area (e.g., a tank) where the 3D object will be manufactured. Component 150 identifies the viscosity of the photosensitive resin, via IoT sensor set 125, and identifies at least the minimum amount of force required for self-assembled cube robot(s) 250 to overcome the viscosity resistance and operate within photosensitive resin 240 (e.g., self-assemble to create the approximate outline). In various embodiments, self-assembled cube robot(s) 250 comprise communication capabilities that enable them to exchange information about their positions, orientations, and connectivity status, which enables them to coordinate their movements. In various embodiments, self-assemble cube robot(s) 250 are programed to move within photosensitive resin using actuators, wherein as self-assemble cube robot(s) 250 move (e.g., self-assemble) to create a predetermined shape/structure self-assemble cube robot(s) 250 detect neighboring self-assemble cube robots and determine if they can connect to each other. Self-assemble cube robot(s) 250 comprise mechanisms that enable them to connect and form stable structures, wherein the mechanisms are magnetic connections, interlocking mechanisms, or other methods to ensure secure attachment known and understood in the art. In various embodiments, responsive to self-assemble cube robot(s) 250 performing self-assembly, self-assemble cube robot(s) 250 collectively form an outline of the hollow portion the 3D object to form a predetermined shape or structure. In various embodiments, responsive to self-assembled robots 250 are assembled to create the 3D object or at least a hollow portion of the 3D object, self-assembled robots 250 connect to one another with magnetic attraction force, so that the assembled cubical robots are stable.

In the depicted embodiment, component 150 identifies when the turbulence on the photosensitive resin is stopped 312. In various embodiments, self-assemble cube robot(s) 250 comprise sensors that can measure and detect changes in the environment. These sensors may be, but are not limited to, accelerometers, gyroscopes, pressure sensors, and/or optical sensors to track movements within the gel. In various embodiments, self-assemble cube robot(s) 250 detect, via sensors, turbulence or disturbances in photosensitive resin 240 caused by movement of the self-assemble cube robot(s) 250, wherein component 150 utilizes the detected turbulence or disturbances in photosensitive resin 240 from self-assemble cube robot(s) 250 to identify when the turbulence on the photosensitive resin is stopped. Turbulence may result in fluctuating sensor readings due to gel displacement or changes in pressure. In various embodiments, self-assemble cube robot(s) 250 continuously log data from the sensors as self-assemble cube robot(s) 250 move within photosensitive resin 240 and collect data on movement patterns, vibrations, and any abrupt changes in sensor readings that indicate turbulence. In various embodiments, component 150 analyze the sensor data, wherein component 150 recognizes patterns associated with turbulence and disturbances in photosensitive resin 240, wherein component 150 takes into account sudden changes in sensor values and the frequency of these changes. In some embodiments, component 150 analyzes the sensor data in real-time. In various embodiments, turbulence is defined by one or more predefined threshold values, wherein the one or more predefined threshold values may be based on empirical data obtained from controlled experiments or simulations. In various embodiments, component 150 utilizes sensor data to identify whether the movement of photosensitive resin 240 falls below a predetermined turbulence threshold for a predetermined duration, wherein responsive to identifying the movement has fallen below the thresholds indicates that the turbulence within photosensitive resin 240 has subsided. In various embodiments, responsive to identifying that movement in photosensitive resin 240 has stopped, component 150 identifies that self-assembled robots 250 are set in place and triggers holographic UV light projection.

In the depicted embodiment, component 150 emits holographic UV light projection 314, via UV holographic projection modules 331 of UV projection system 330, to create the 3D object. In various embodiments, the created 3D object has at least one hollow portion. In various embodiments, the UV light will be emitted by UV holographic projection modules 331 to photosensitive resin 240 around the shape formed by self-assembled robots 250, wherein the UV light will cause photosensitive resin 240 to cure and/or harden around self-assembled robots 250 and cause photosensitive resin 240 to solidify and form the 3D object. In various embodiments, the solidified 3D object is removed from the photosensitive resin, wherein component 150 utilizes the solidified 3D object and received instructions 302 to perform manufacturing edits to complete the 3D object. Manufacturing edits may be polishing, resurfacing, and/or any other manufacturing techniques known and understood in the art. In the depicted embodiment, component 150 creates the 3D object (creating) 316 by finalizing the shape of the object based on the received instructions 302. In various embodiments, responsive to the at least hollow portion of the 3D object being formed and solidified, self-assembled robots 250 are removed from the form shape to leave at least the formed hollow portion. In various embodiments, self-assembled robots 250 are removed from photosensitive resin 240 and/or the solidified photosensitive resin 240 by changing the magnetic force holding self-assembled robots 250 in place from attraction repulsion, and/or applying controlled heating on the solidified object to enable thermal expansion of the solidified object and enable self-assembled robots 250 to be removed from the solidified object. In various embodiments, leveraging the additional clearance created by thermal expansion and magnetic repulsion, self-assembled robots 250 will disengage one by one exit from the created mold.

Figure 4:
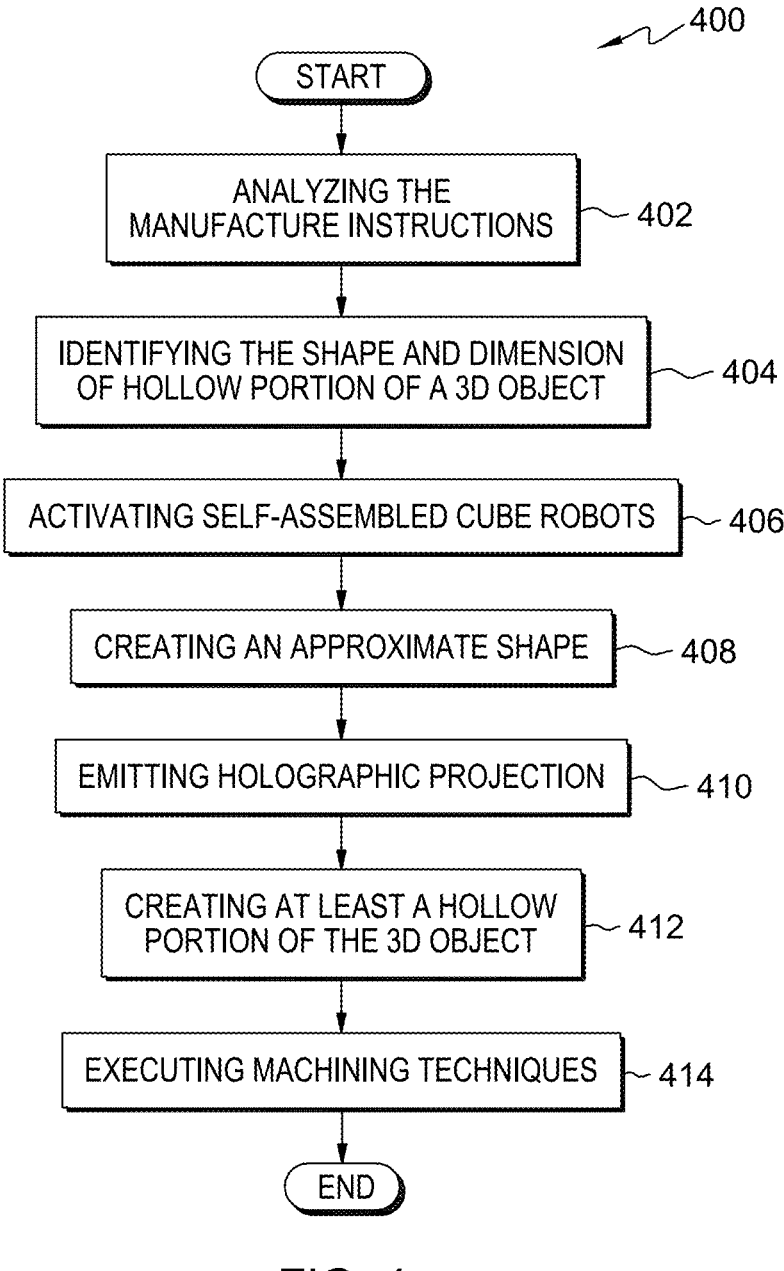
FIG. 4 illustrates operational steps of the 3D manufacturing program, on a server computer within the distributed data processing environment of FIGS. 1, in accordance with an embodiment of the present invention.

FIG. 4 illustrates operational steps of component 150, generally designated 400, in communication with client computer 101, remote server 104, private cloud 106, EUD 103, client computer 101, and/or public cloud 105, within distributed data processing environment 100, for manufacturing a 3D object, the computer-implemented method, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In block 402, component 150 analyzes manufacture instructions. In various embodiment, component 150 receives and/or retrieves manufacture instructions from a user and/or a data storage component (e.g., storage 124 or remote database 130). Component 150 utilizes the received manufacture instructions to create the 3D physical object that is within the instructions. The received manufacture instructions comprise details and specifications (3D model) associated with 3D object. The 3D model provides the reference shape and dimensions of the final product and will identify the 3D object dimensional specification of the 3D object that is to be manufactured. In various embodiments, component 150 analyzes the shape and dimension of the 3D object associated with received manufacture instructions.

In block 404, component 150 identifies the shape and dimension of one or more hollow portions of a 3D object. In various embodiment, component 150 identifies the dimensional specification of the to be manufactured 3D object, based on the analysis. Component 150 utilizes the identified dimensional specification 306 to identify any hollow portions within the to be manufactured 3D object. In various embodiments, component 150 utilizes the identified hollow portions and 3D model from the received instructions to create a mold using self-assembled robots and photosensitive resin.

In various embodiment, component 150 identifies the dimensions and capability of self-assemble robot(s) 250. Component 150 may identify the dimensions and capability of self-assemble robot(s) 250, and the capability of self-assemble robot(s) 250 to climb over each other. In various embodiments, component 150 compares the identified dimensions and capability of each of self-assembled robot(s) 250 against each other. In various embodiments, component 150 determines the dimensions of the individual cubes intended to arrange within the 3D space to create the 3D object within photosensitive resin 240. The measured dimensions comprise: the length, width, and height of each self-assembled robot. In various embodiments, component 150 retrieves and/or receives the dimensions of the identified hollow space within the 3D object model, wherein the dimensions comprises: length, width, and height of the available space. In various embodiments, component 150 calculates the volume of each self-assembled cube robot(s) 250 using predetermined dimensions (e.g., Volume=Length×Width×Height). In various embodiments, component 150 calculates the total volume of the hollow 3D space using the identified dimensions. In various embodiments, component 150 divides the total volume of the available 3D space by the volume of each self-assembled cube robot(s) 250. This will provide the maximum theoretical number of self-assembled cube robot(s) 250 that could fit within the space without overlap or voids. Depending on the arrangement pattern, component 150 considers the potential overlap or gaps between self-assembled cube robot(s) 250. In various embodiments, component 150 may identify and generate a list of different arrangement patterns have varying packing efficiencies based on the identified dimensions and capabilities.

In block 406, component 150 activates self-assembled cube robots to form the shape and match the dimensions of at least the identified hollow portion of the 3D object. In various embodiments, responsive to identifying the mold profile or one or more hollow-shaped portions of a to be manufactured 3D object, component 150 selects specific self-assembled robots 250 based on the dimensions of the self-assembled robots 250 and the identified mold profile and/or identified hollow portions of the 3D object. In some embodiments a combination of different self-assembled robots 250 with different dimensions are used to create an outline of the 3D object or at least the hollow portion of the 3D object. For example, at least two different types (e.g., size and shape) of self-assembled robots 250 are assembled to create an approximate shape of the 3D object and will displace the photosensitive resin. In various embodiments, while assembling self-assembled robots 250 to create the identified shape, component 150 identifies a tolerance limit (e.g., a predetermined tolerance threshold), so that the tolerance can be removed with machining. For example, if the dimension of a hollow space in any direction is 10 cm, then the cubical self-assemble robots are to be selected, so that minimum possible tolerance can be kept based on available types of cubical robot. In this example, 9.5 cm can be created, so 0.5 cm will be the tolerance, wherein the self-assembled robots are removed with post processing methods. Post processing methods comprise cutting, grinding, polishing, and/or any other type of post processing method known and understood in the art.

In block 408, component 150 creates an approximate shape. In the depicted embodiment, component 150 creates an outline of the hollow shape 310. In various embodiments, component 150 creates an outline of the hollow portion of the 3D object by assembling the self-assembled cube robot(s) 250 within photosensitive resin to create a structure that is an approximate shape of the identified hollow portion of the 3D object, wherein the approximate shape is shape corresponding to the 3D model that is within a predetermined threshold of acceptance. In various embodiments, self-assembled cube robot(s) 250 are submerged in photosensitive resin 240 where they create and hold the structure of the approximate shape to create the outline of the hollow portion of the intended 3D hollow shape of the 3D object. In various embodiments, self-assembled cube robot(s) 250 comprise components that enable each self-assembled cube robot to connect and assemble autonomously. Each cube robot of self-assembled cube robot(s) 250 comprises sensors, actuators, and mechanisms for movement and connection. In various embodiments, photosensitive resin 240 is held within a predetermined area (e.g., a tank) where the 3D object will be manufactured. Component 150 identifies the viscosity of the photosensitive resin, via IoT sensor set 125, and identifies at least the minimum amount of force required for self-assembled cube robot(s) 250 to overcome the viscosity resistance and operate within photosensitive resin 240 (e.g., self-assemble to create the approximate outline). In various embodiments, self-assembled cube robot(s) 250 comprise communication capabilities that enable them to exchange information about their positions, orientations, and connectivity status, which enables them to coordinate their movements. In various embodiments, self-assemble cube robot(s) 250 are programed to move within photosensitive resin using actuators, wherein as self-assemble cube robot(s) 250 move (e.g., self-assemble) to create a predetermined shape/structure self-assemble cube robot(s) 250 detect neighboring self-assemble cube robots and determine if they can connect to each other. Self-assemble cube robot(s) 250 comprise mechanisms that enable them to connect and form stable structures, wherein the mechanisms are magnetic connections, interlocking mechanisms, or other methods to ensure secure attachment known and understood in the art. In various embodiments, responsive to self-assemble cube robot(s) 250 performing self-assembly, self-assemble cube robot(s) 250 collectively form an outline of the hollow portion the 3D object to form a predetermined shape or structure.

In block 410, component 150 emit holographic projection. In various embodiments, component 150 emits holographic UV light projection, via UV holographic projection modules of a UV projection system to create the 3D object. In various embodiments, the UV light will be emitted by UV holographic projection modules 331 to photosensitive resin 240 around the shape formed by self-assembled robots 250, wherein the UV light will cause photosensitive resin 240 to cure and/or harden around self-assembled robots 250 and cause photosensitive resin 240 to solidify and form the 3D object.

In block 412, component 150 creates at least a hollow portion of the 3D object. In various embodiments, the created 3D object has at least one hollow portion. In various embodiments, the solidified 3D object is removed from the photosensitive resin, wherein component 150 utilizes the solidified 3D object and the received instructions to perform manufacturing edits to complete the 3D object.

In block 414, component 150 execute machining techniques to complete the manufacture process. In various embodiments, component 150 utilizes the solidified 3D object and received instructions to perform manufacturing edits to complete the 3D object. In various embodiments, component 150 creates the 3D object (creating) 316 by finalizing the shape of the object based on the received instructions 302. In various embodiments, responsive to the at least hollow portion of the 3D object being formed and solidified, self-assembled robots 250 are removed from the form shape to leave at least the formed hollow portion. In various embodiments, self-assembled robots 250 are removed from photosensitive resin 240 and/or the solidified photosensitive resin 240 by changing the magnetic force holding self-assembled robots 250 in place from attraction repulsion, and/or applying controlled heating on the solidified object to enable thermal expansion of the solidified object and enable self-assembled robots 250 to be removed from the solidified object. In various embodiments, leveraging the additional clearance created by thermal expansion and magnetic repulsion, self-assembled robots 250 will disengage one by one exit from the created mold.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating objects from photosensitive resin using self-assembled cube robots, comprising:
   determining, based on shape and dimensions of a hollow portion of a three-dimensional (3D) object, to create the 3D object using self-assembling cube robots submerged in a photosensitive resin tank;
   instructing the self-assembling cube robots to collaborate to form an approximate shape of the hollow portion of the 3D object; and
   causing an ultraviolet (UV) projection system to emit holographic light beams around a structure of the self-assembling cube robots to create the 3D object with the hollow portion.

2. The method of claim 1, further comprising:
   determining that a turbulence on the photosensitive resin caused by the self-assembling cube robots forming the approximate shape has stopped.

3. The method of claim 1, further comprising:
   determining an effectiveness of the self-assembling cube robots to form the approximate shape of the hollow portion of the 3D object.

4. The method of claim 3, wherein determining an effectiveness of the self-assembling cubes further comprises:
   identifying dimensions of the self-assembling cube robots and a capability of self-assemble robots to climb over each other.

5. The method of claim 1, further comprising:
   receiving manufacture instructions manufacture the 3D object.

6. The method of claim 5, further comprising:
   analyzing the shape and dimensions of the 3D object associated with received manufacture instructions.

7. The method of claim 1, further comprising:
   responsive to the at least hollow portion of the 3D object being formed and solidified, removing the self-assembling cube robots from the form shape to leave at least the formed hollow portion.

\* \* \* \* \*